US 7,033,422 B2

United States Patent
Bloomer

(10) Patent No.: US 7,033,422 B2
(45) Date of Patent: Apr. 25, 2006

(54) RELEASE AGENTS, RELATED ANTI-FREEZING/DEICING COMPOSITIONS, AND RELATED METHODS

(75) Inventor: Todd A. Bloomer, Georgetown, KY (US)

(73) Assignee: Grain Processing Corporation, Muscatine, IA (US)

(*) Notice: Subject to any disclaimer, the term of this patent is extended or adjusted under 35 U.S.C. 154(b) by 56 days.

(21) Appl. No.: 10/660,334

(22) Filed: Sep. 11, 2003

(65) Prior Publication Data

US 2004/0206931 A1    Oct. 21, 2004

Related U.S. Application Data

(60) Provisional application No. 60/409,831, filed on Sep. 11, 2002.

(51) Int. Cl.
*C09D 5/20* (2006.01)
*B05D 3/00* (2006.01)

(52) U.S. Cl. ............... 106/2; 106/38.23; 106/38.24; 106/162.1; 156/289; 264/130; 264/213; 264/338; 427/154; 510/366

(58) Field of Classification Search ............... 106/2, 106/13, 38.23, 38.24, 162.1; 252/70; 156/289; 264/130, 213, 338; 427/154; 510/366
See application file for complete search history.

(56) References Cited

U.S. PATENT DOCUMENTS

| 4,078,104 | A | | 3/1978 | Martin |
| 4,676,918 | A | | 6/1987 | Tóth et al. |
| 5,186,979 | A | * | 2/1993 | Ballenger et al. ........... 427/156 |
| 5,407,490 | A | * | 4/1995 | Zofchak ...................... 134/34 |
| 5,494,502 | A | * | 2/1996 | DeLong .......................... 106/2 |
| 5,635,101 | A | | 6/1997 | Janke et al. |
| 5,709,812 | A | | 1/1998 | Janke et al. |
| 5,709,813 | A | | 1/1998 | Janke et al. |
| 5,888,279 | A | * | 3/1999 | Salmonsen et al. ............. 106/2 |
| 5,900,048 | A | * | 5/1999 | Olson et al. ..................... 106/2 |
| 6,080,330 | A | * | 6/2000 | Bloomer ....................... 252/70 |
| 6,143,812 | A | | 11/2000 | Martin et al. |
| 6,416,684 | B1 | | 7/2002 | Bloomer |
| 6,468,442 | B1 | * | 10/2002 | Bytnar ......................... 252/70 |
| 6,486,249 | B1 | * | 11/2002 | Dituro et al. ............... 524/388 |
| 6,506,444 | B1 | * | 1/2003 | Mahr et al. .................. 427/138 |
| 6,878,308 | B1 | * | 4/2005 | Schilling ...................... 252/70 |
| 6,902,606 | B1 | * | 6/2005 | Davies ........................... 106/2 |
| 2002/0150676 | A1 | * | 10/2002 | Kinnaird ..................... 427/136 |

FOREIGN PATENT DOCUMENTS

SU    1664808 A1 *  7/1991

* cited by examiner

*Primary Examiner*—Anthony J. Green
(74) *Attorney, Agent, or Firm*—Banner & Witcoff, Ltd

(57) ABSTRACT

Three novel types of release agents comprising waste products of several useful product-making processes well known in the art are disclosed. The first type of release agent is comprised of desugared sugar beet molasses, which is a waste product in the process of removing sugar from sugar beet molasses. The second type of release agent is sugar cane molasses. The third type of agent is a class of compositions comprising steepwater, brewers condensed solubles and distillers solubles.

8 Claims, No Drawings

RELEASE AGENTS, RELATED ANTI-FREEZING/DEICING COMPOSITIONS, AND RELATED METHODS

This application claims priority to Provisional Patent Application Ser. No. 60/409,831, filed on Sep. 11, 2002. The prior application is hereby incorporated by reference.

FIELD OF THE INVENTION

The present invention relates generally to side release aids or agents for use in preventing asphalt, aggregate materials, and the like from sticking or adhering to a surface, such as vehicle beds or railway cars, as well as to compositions that may be used for preventing piles of aggregate materials from freezing in truck beds or railway cars.

BACKGROUND OF THE INVENTION

Asphalt is a hydrocarbon-based substance primarily used in paving roads, parking lots, walkways, or the like, but also in roofing and waterproofing applications. Typically, asphalt is made at an asphalt plant and delivered hot to the construction site in a transport vehicle, such as a dump truck or the like. As is well known in the art, hot asphalt tends to stick or adhere on contact to any surface it touches, including the portion of the dump truck holding the asphalt, which is typically the bed. Consequently, workers must spend considerable time and effort manually trying to remove the asphalt from the truck beds. However, the effort is somewhat futile, since some of the asphalt invariably cannot be easily removed from the truck bed using manual implements, such as picks, scrapers or shovels. Moreover, the asphalt may even become stuck to the implements used to remove it from the truck bed. Not only is asphalt wasted as a result of this adherence, but deposits may build up in the truck beds that can be extraordinarily difficult to remove without the use of chemical agents. This may not only create delays and added expense, but also the overall quality of the paving work may decline as a result. In addition to the decline in the overall quality of work, asphalt sticking problems cause other concerns. For example, when the asphalt sticks to the truck beds or rail cars, the customer often does not get what was paid for. Furthermore, when a load of asphalt cannot be completely unloaded, the next load will not be a "full load" unless someone else cleans the transporting vehicle bed. A similar problem is also encountered with aggregate materials.

This problem with asphalt has been widely recognized for years in the industry. To some extent, a similar problem is also encountered with aggregate materials (gravel, crushed rock or stone, coal, sand, etc.), which tend to stick together and to the sides of the truck bed, especially when wet. The most common approach to cope with it is to apply release agents to the truck beds and equipment. Although this is an effective method for treating the problem, many release agents are exceedingly expensive (especially when frequent application is required) or hazardous to the environment.

For example, an early solution was to pre-treat the truck bed with hydrocarbon-based fuels, such as diesel fuel and kerosene. Although these fuels are effective in preventing the asphalt from adhering and are relatively inexpensive, they often combined with and diluted the asphalt, making it more susceptible to wear and damage when used as pavement. Additionally, these fuels are frequently linked to environmental problems, such as ground water contamination. The fumes, emissions and odors also raise health concerns because workers could be exposed through skin contact and inhalation. Such fuels are also non-renewable resources.

The health and environmental concerns associated with the use of hydrocarbon fuels as release agents led the industry to look for safer alternatives. An exemplary solution is provided in U.S. Pat. No. 4,078,104 to Martin, the disclosure of which is incorporated herein by reference. This patent discloses a release agent containing polyialkylsiloxanes (polymers), which allegedly possess effective release properties. However, this agent is not inexpensive and requires additional, specialized equipment for its application process. Other polymer-based mixtures are also ineffective because they are either unstable and react either too slowly or quickly with the asphalt (see, e.g., U.S. Pat. No. 6,143,812 to Martin et al., the disclosure of which is also incorporated herein my reference).

Since the hydrocarbon-based fuels often reacted with the asphalt, the Environmental Protection Agency (EPA) promulgated standards that require release agents to not strip or degrade the asphalt. The recent trend is toward more natural and safer products. However, most of these safer alternatives are not very effective. For example, U.S. Pat. No. 5,494,502 to DeLong, the disclosure of which is incorporated herein by reference, describes a release agent comprising of emulsions from a fatty oil of plants or animals. Since it is oil-based, this release agent may be expensive when used in large quantities. To reduce the expense, this patent proposes the use of a special foaming apparatus, which complicates the application process.

Accordingly, a need exists for a release agent that is inexpensive, readily available, environmentally friendly, and easy to apply without the need for specialized equipment. The release agent would provide a slick, long-lasting barrier on the application surface, such as a truck bed, that does not allow asphalt or aggregate materials to stick. In addition, the release agents may also have moderate anti-freezing and deicing characteristics.

DESCRIPTION OF THE INVENTION

Three novel types of release agents comprising waste products of several useful product-making processes well known in the art are disclosed. The first type of release agent is comprised of desugared sugar beet molasses, which is a waste product in the process of removing sugar from sugar beet molasses. Methods of obtaining desugared sugar beet molasses are described in detail in U.S. Pat. No. 6,416,684 to Bloomer, the disclosure of which is incorporated herein by reference. However, since desugared sugar beet molasses is readily available, the particular method used to obtain it is not considered essential to the present invention.

The second type of release agent is sugar cane molasses. As well known in the art, sugar cane molasses is a waste product of the process performed to obtain sugar from sugar cane. Despite the fact that sugar cane molasses still contains sugar, it may be referred to in the vernacular as "desugared sugar cane molasses." This merely signifies that a portion of the sugar has been removed.

The third type of agent is actually a class of compositions comprising steepwater, brewers condensed solubles and distillers solubles. These waste products are obtained from processes involving the making of wine, beer and whiskey, respectively. As with desugared sugar beet molasses, these agents are readily available and, thus, the manner used to obtain them is not critical to the present invention. Characteristics of these compositions may be found in U.S. Pat.

Nos. 5,709,813, 5,709,812, 5,635,101, all to Janke et al., and U.S. Pat. No. 4,676,918 to Toth, the disclosures of which are all incorporated herein by reference.

The effectiveness of all three products as asphalt releasing agents was tested experimentally. The purpose of the testing was to determine if the materials would leave a sufficiently slick residue such that each could serve as a release agent and prevent not only aggregate material, but also hot asphalt from sticking to surfaces to which it is applied, such as metal truck beds. It was known prior to testing that all of these materials were non-corrosive because the desugared sugar beet molasses had previously been tested, as described in the above-referenced '684 patent, and similar test data on the other two classes of agents is publicly available.

In one set of experiments, the following procedure was repeated three times without any further addition of material to the desugared sugar beet molasses. 100 milliliters (mls) of desugared sugar beet molasses containing 65% solids was added to an aluminum pie pan (which simulates a metal or aluminum truck bed) and baked at 400 degrees Fahrenheit for ninety, seventy-five, sixty and forty-five minutes, respectively. Next, 100 mls of 57.5% solids were added to an aluminum pie pan and baked at 400 degrees Fahrenheit for 90, 75, 60 and 45 minutes.

The same experimental procedure used with the desugared sugar beet molasses was used with the sugar cane molasses. The following procedure was repeated three times without any further addition of material. 100 mls of 65% solids were added to an aluminum pie pan and baked at 400 degrees Fahrenheit for the above-mentioned times. Additionally, 100 mls of 57.5% solids were added to the pan and baked at 400 degrees Fahrenheit for the four appropriate times.

The experimental procedures conducted with the steepwater, brewers condensed solubles and distillers solubles were slightly different from those conducted with the molasses compositions. The following procedure was repeated at least three times without adding material to the pan. Specifically, 100 mls of 50% solids were added to an aluminum pie pan and baked at 400 degrees Fahrenheit for 90 minutes three times. Then 100 mls of 50% solids with 20% oil were added to an aluminum pie pan and baked at 400 degrees Fahrenheit for four times.

Both the desugared sugar beet molasses and the sugar cane molasses showed the same characteristics and had the same results. Specifically, after baking, the pans appears to have a sticky thick residue, which became even stickier as the material cooled. After repeated testing, the material had a "burnt" odor, but it remained pliable and slick throughout the experiment.

The experiments performed with the steepwater, brewers condensed solubles and distillers solubles alone were somewhat less successful. However, when the oil products were added to the solution, the release characteristics of the overall mixture improved dramatically. The performance of the products increased relative to the amount of oil added. Furthermore, this mixture could be used as a release agent for any material in colder temperatures (i.e., during the winter months in parts of the United States) because it will not freeze. However, as noted above, oil adds to the expense, so this embodiment may be less preferred from a commercial standpoint.

The makeup of the compositions generally includes anywhere from up to 99% solids by weight. Additionally, the compositions can be used without further additions (100% or neat), or mixed with additional water in the range of from 1–99% by weight, depending on the application. In the case where the release agent is used with a hot material, such as asphalt, the water simply boils off. Finally, all of the products can be mixed with any oil, or surfactant, or combination thereof at any ratio from 1–99% by weight.

The advantages of using the molasses by-products and the above-described solubles as releasing agents are manifold. First of all, these compositions are simply waste products and, thus, are inexpensive. In addition, due to the large amount of sugar, beer, wine, and whiskey produced around the world, the compositions are readily available. These compositions also have good thermodynamic properties (i.e., high boiling points), so they do not dissolve under high heat. Rather, only the moisture is boiled away.

In addition, the coverage of the compositions gets better over long term use, so multiple uses are possible. The products are applied directly to the truck beds without the need for special equipment. The compositions are generally not reactive, so the asphalt is not damaged. They also tend to adhere to metal when sprayed and, upon drying, provide a slick barrier that will not allow asphalt to stick to truck beds or other equipment (especially when dried through the application of heat).

As discussed in my prior issued patents and the other patents cited therein, the above-described release agents also may serve as anti-freezing or deicing compositions. However, it has been discovered that a novel application of these compositions or agents is on aggregate material, such as cut stone or rock, coal, gravel, sand, etc., kept in certain quantities (often called "piles") in truck beds, rail cars or the like. As should be appreciated, to be effective, the application need only be made to a portion of the material (e.g, the outside in a pile). The application may also be made by "pre-wetting" as the material is unloaded such that a substantially even application is made. The effective amount of the molasses or solubles may be from 1–100%, with any balance being water. In view of the anti-corrosive properties, which are outlined in my prior patents and elsewhere, the molasses and solubles may also be admixed with other compositions, such as ethylene glycol, di-ethylene glycol, soluble potassium salts, and the sodium, calcium, magnesium, and potassium salts of acetate, chloride, carbonate, formate, and combinations or mixtures thereof, without concern for the corrosive effects thereof.

The foregoing description of a preferred embodiment of the invention has been presented for purposes of illustration and description. It is not intended to be exhaustive or to limit the invention to the precise form disclosed. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. A method of preventing hot asphalt from adhering to a surface, comprising:
   applying a composition including at least one of desugared sugar beet molasses, sugar cane molasses, steepwater, brewers condensed solubles, distillers solubles, or mixtures thereof to the surface.

2. A method according to claim 1, said composition comprising desugared sugar beet molasses.

3. A method according to claim 1, said composition comprising sugar cane molasses.

4. A method according to claim 1, said composition comprising steepwater.

5. A method according to claim 1, said composition comprising brewers condensed solubles.

6. A method according to claim 1, said composition comprising distillers solubles.

7. A method according to claim 1, said composition further including an oil.

8. A method according to claim 1, said composition further comprising a surfactant.

* * * * *